(12) United States Patent
Zhao et al.

(10) Patent No.: US 12,445,620 B2
(45) Date of Patent: Oct. 14, 2025

(54) SYSTEMS AND METHODS FOR CROSS-COMPONENT GEOMETRIC/WEDGELET PARTITION DERIVATION

(71) Applicant: Tencent America LLC, Palo Alto, CA (US)

(72) Inventors: Xin Zhao, Palo Alto, CA (US); Han Gao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 126 days.

(21) Appl. No.: 18/208,114

(22) Filed: Jun. 9, 2023

(65) Prior Publication Data

US 2024/0129474 A1 Apr. 18, 2024

Related U.S. Application Data

(60) Provisional application No. 63/416,362, filed on Oct. 14, 2022.

(51) Int. Cl.
*H04N 19/132* (2014.01)
*H04N 19/119* (2014.01)
*H04N 19/176* (2014.01)
*H04N 19/186* (2014.01)

(52) U.S. Cl.
CPC ......... *H04N 19/132* (2014.11); *H04N 19/119* (2014.11); *H04N 19/176* (2014.11); *H04N 19/186* (2014.11)

(58) Field of Classification Search
CPC .. H04N 19/105; H04N 19/119; H04N 19/132; H04N 19/176; H04N 19/186
See application file for complete search history.

(56) References Cited

U.S. PATENT DOCUMENTS

| | | | |
|---|---|---|---|
| 2020/0128259 A1* | 4/2020 | Helle | H04N 19/147 |
| 2020/0296380 A1* | 9/2020 | Aono | H04N 19/593 |
| 2022/0021883 A1* | 1/2022 | Esenlik | H04N 19/176 |
| 2022/0086387 A1* | 3/2022 | Wang | H04N 7/01 |

OTHER PUBLICATIONS

Tencent Technology, ISRWO, PCT/US2023/025762, Sep. 20, 2023, 12 pgs.

* cited by examiner

*Primary Examiner* — Dakshesh D Parikh
(74) *Attorney, Agent, or Firm* — Morgan, Lewis & Bockius LLP

(57) ABSTRACT

The various implementations described herein include methods and systems for coding video. In one aspect, a method includes receiving video data including a picture, wherein the picture is coded using at least a first color component and a second color component, and the picture includes a first block that is coded in a geometric partition mode, the first block including a first geometric partition and a second geometric partition; reconstructing samples in a first geometric partition of the first color component of the first block; deriving samples in the first geometric partition of the second color component of the first block based on the reconstructed samples of the first color component of the first block; and decoding the first block in the picture based at least on the reconstructed samples in the first geometric partition of the first color component and the second color component of the first block.

19 Claims, 7 Drawing Sheets

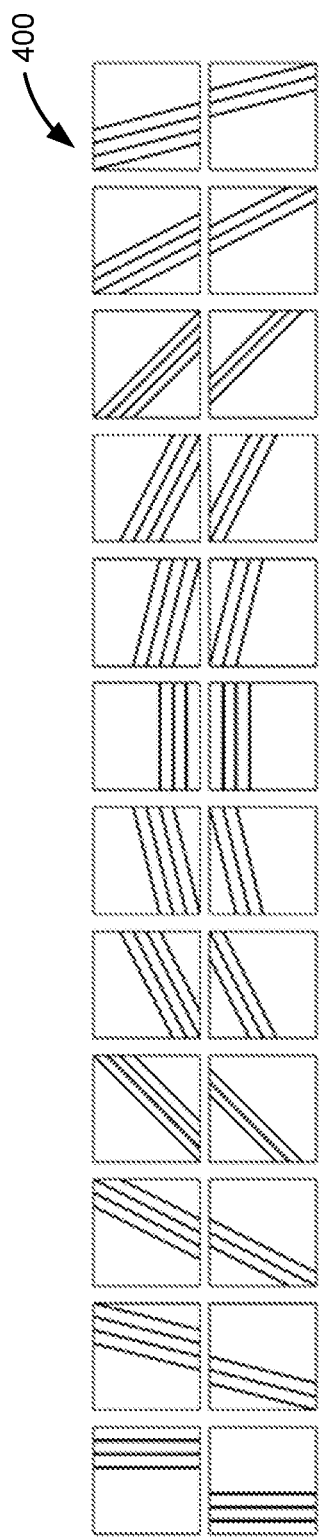
FIG. 4A
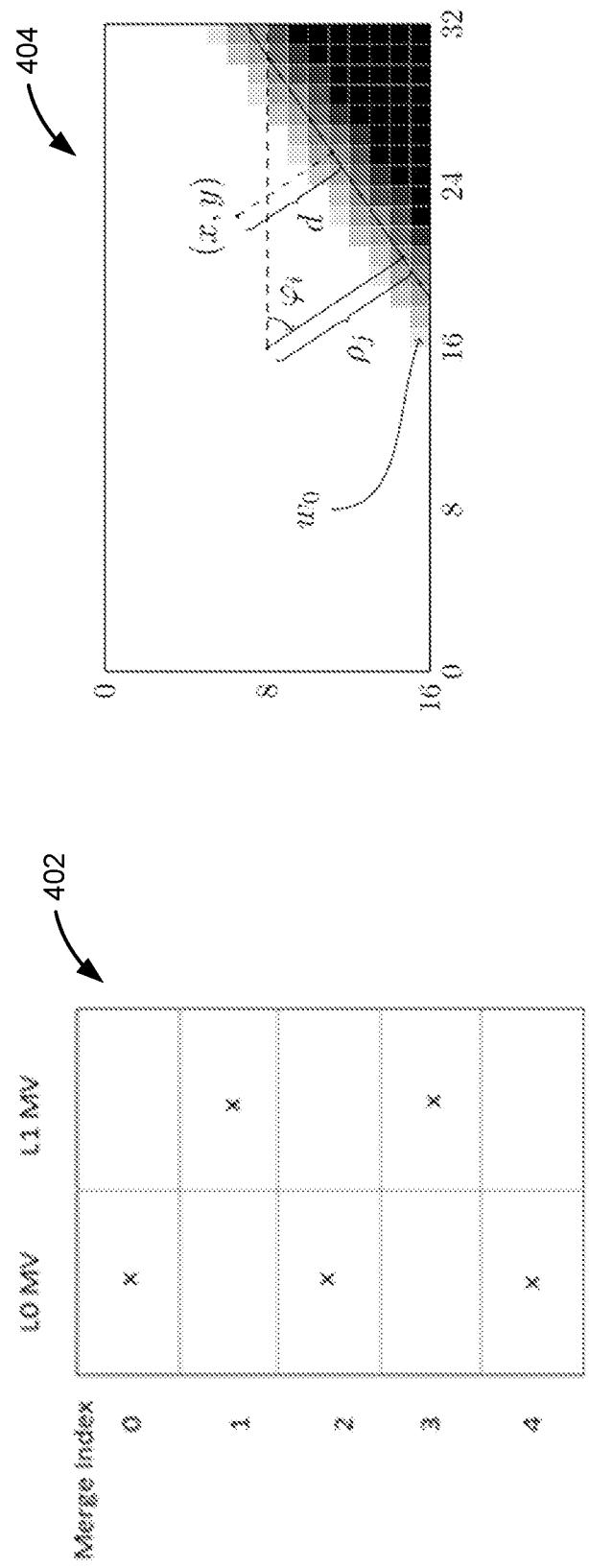
FIG. 4C
FIG. 4B

SYSTEMS AND METHODS FOR CROSS-COMPONENT GEOMETRIC/WEDGELET PARTITION DERIVATION

RELATED APPLICATIONS

This application claims priority to U.S. Provisional Patent Application No. 63/416,362, entitled "Cross-component geometric/wedgelet partition derivation" filed Oct. 14, 2022, which is hereby incorporated by reference in its entirety.

TECHNICAL FIELD

The disclosed embodiments relate generally to video coding, including but not limited to systems and methods for cross-component geometric/wedgelet partition derivation.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes deriving partitioning boundaries that are not limited to a set of pre-defined partitioning patterns that use only one straight line as the partitioning boundary. Such a single straight line partitioning boundary may not efficiently model irregular partitioning patterns. Thus, existing partitioning modes may be sub-optimal for more complicated video objects. In these cases, more accurate partitioning modes can better represent the shape of the video object and therefore can improve the accuracy of the motion predictions and thus the quality/accuracy of the video encoding and decoding.

In accordance with some embodiments, a method of video coding is provided. The method includes receiving video data including a picture, wherein the picture is coded using at least a first color component and a second color component, and the picture includes a first block that is coded in a geometric partition mode, the first block including a first geometric partition and a second geometric partition; reconstructing samples in a first geometric partition of the first color component of the first block; deriving samples in the first geometric partition of the second color component of the first block based on the reconstructed samples of the first color component of the first block; and decoding the first block in the picture based at least on the reconstructed samples in the first geometric partition of the first color component and the second color component of the first block. The method includes obtaining reconstruction data of a first color component of a first block of video data using a first geometric partition; and generating reconstruction data of a second color component of the first block of video data based on the reconstruction data of the first color component of the first block of video data using a second geometric partition.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 4A shows different examples of geometric partitioning mode (GPM) splits grouped by identical angles in accordance with some embodiments.

FIG. 4B is an example of an extended merge prediction process in accordance with some embodiments.

FIG. 4C is an example for generating a blending weight $w_0$ using geometric partitioning mode in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes, among other things, using various partitioning techniques for partitioning video blocks for more optimal motion prediction and higher quality encoding. For example, existing partitioning modes may be sub-optimal for more complicated video objects, as those GPM/wedgelet designs may allow limited set of pre-defined partitioning patterns using only one straight line as the partitioning boundary. Such a straight line partitioning boundary may not provide the most efficient partitioning pattern for objects that are irregular. In these cases, more accurate partitioning modes can better represent the shape of the video object and therefore can improve the accuracy of the motion predictions and thus the quality/accuracy of the video encoding and decoding.

Example Systems and Devices

Figure 1:
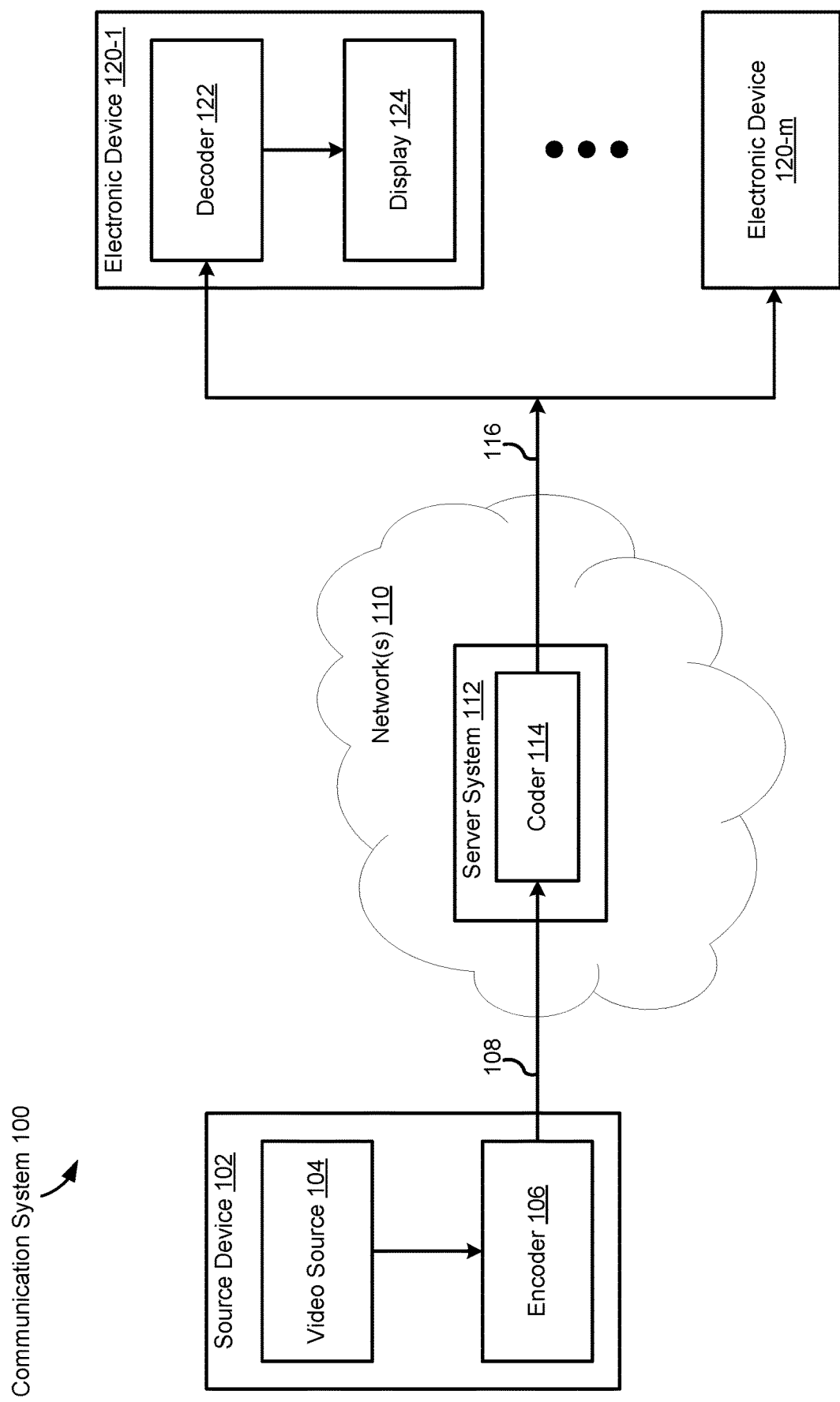
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
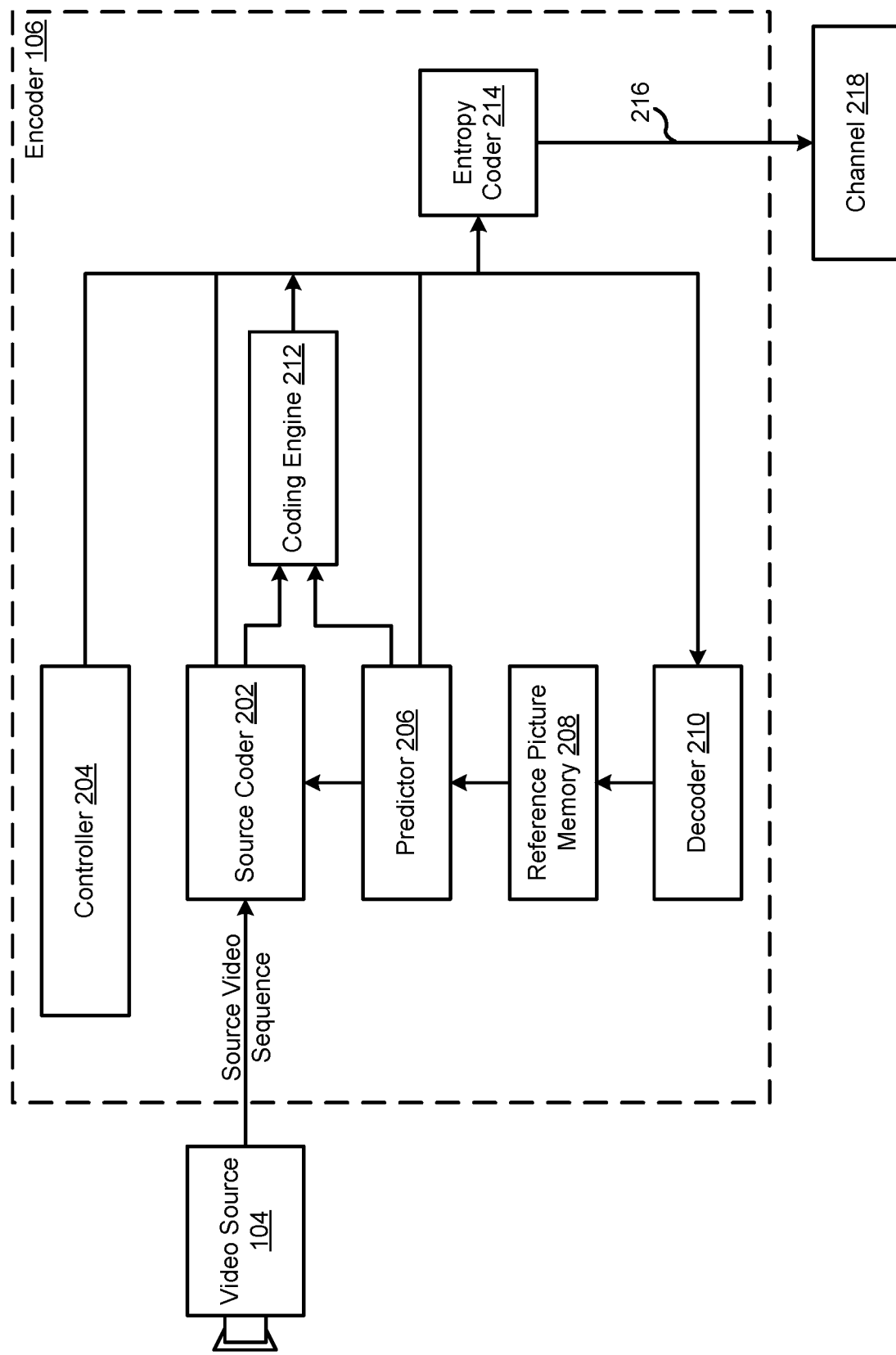
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
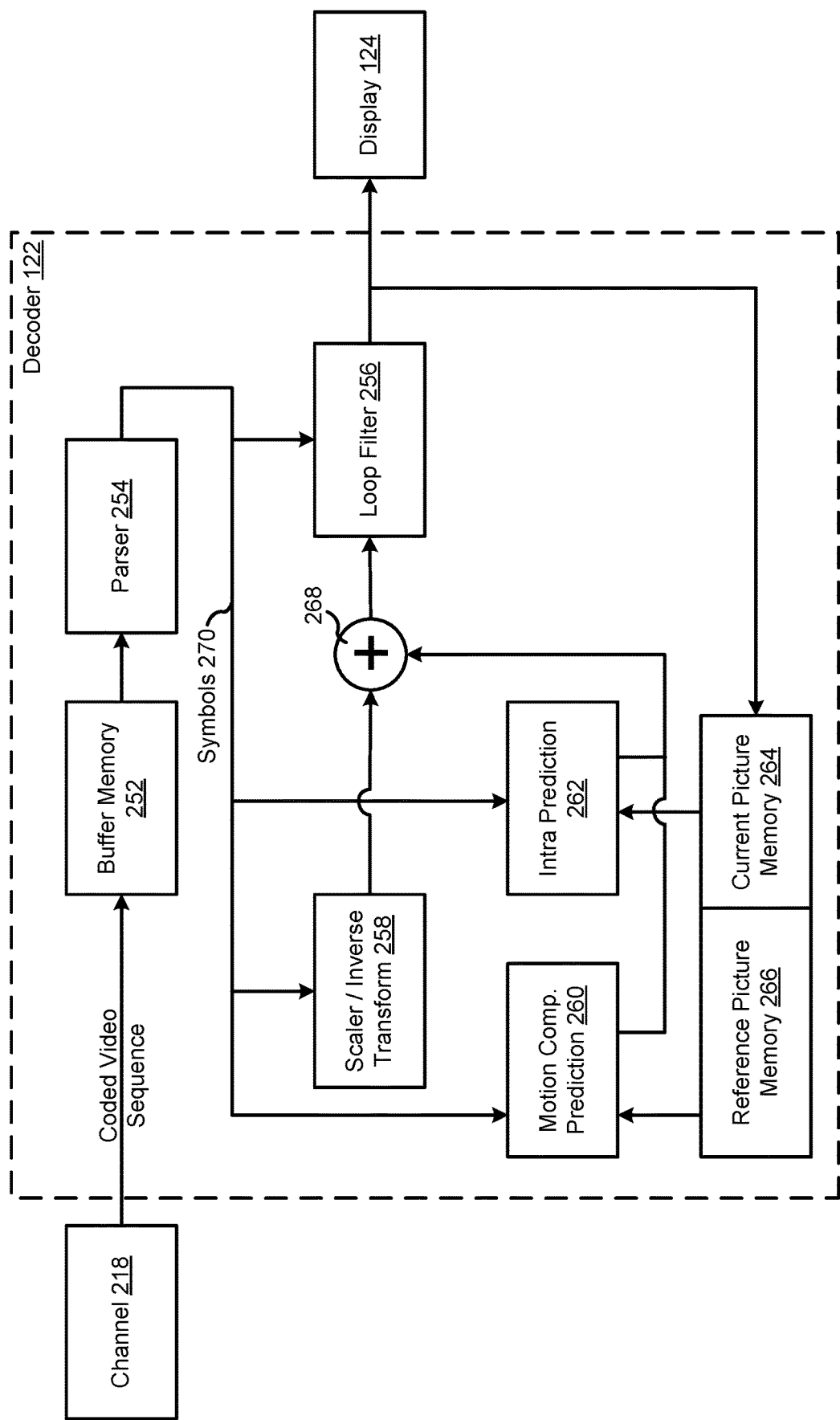
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
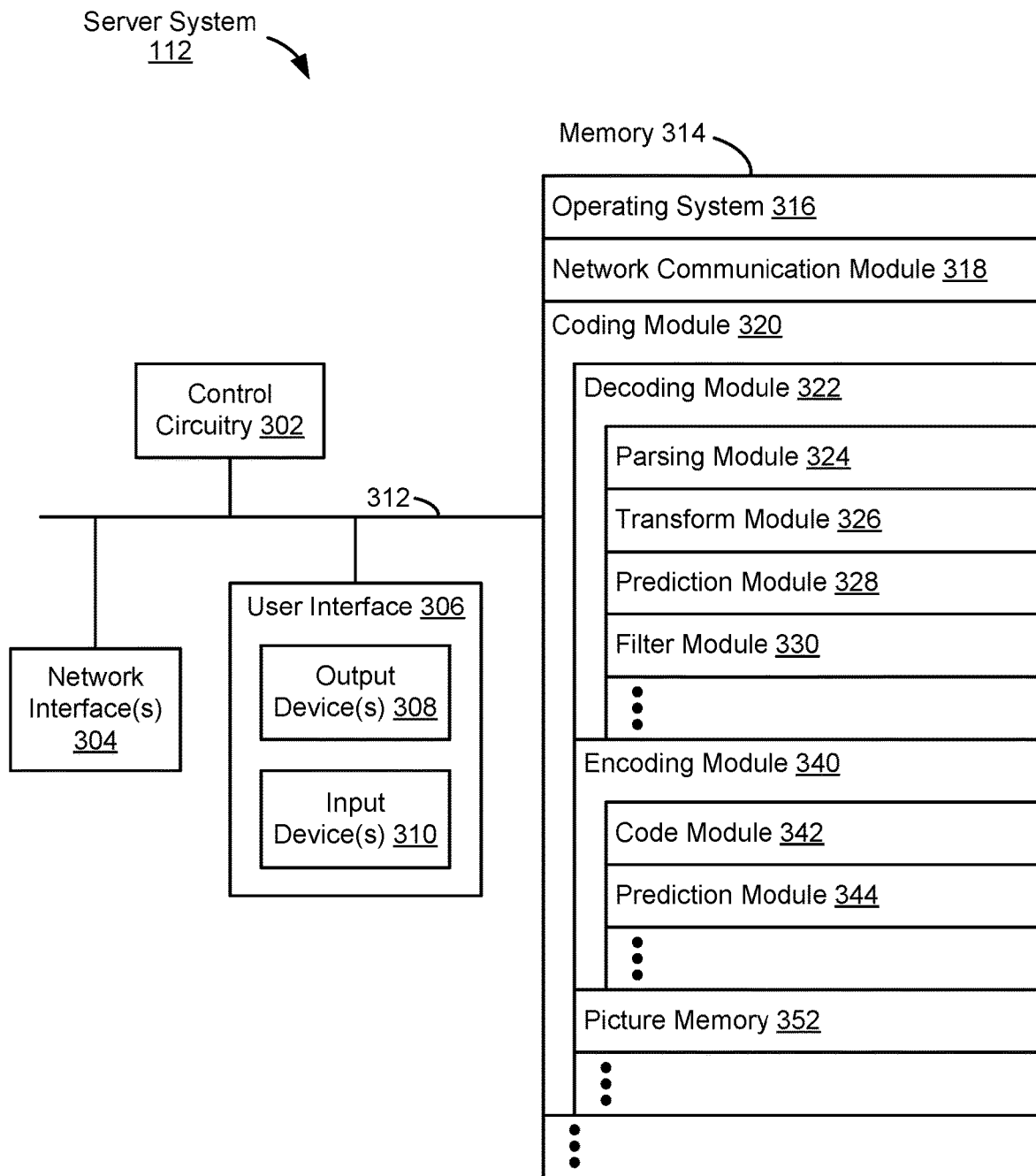
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and
    - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches
Geometric Partitioning Mode in VVC

VVC supports geometric partitioning modes (GPM) for inter prediction. GPM separates a coding block into two regions by one of the predefined 64 types of straight lines, generates inter predicted samples for each separated region, and then blends them to obtain the final inter predicted samples. In some embodiments, GPM includes a non-horizontal splitting of a block into two parts. A geometric partitioning mode (GPM) may focus on inter-picture predicted CUs. When GPM is applied to a CU, the CU is split into two parts via a straight partitioning boundary in conventional methods. The location of the partitioning boundary may be mathematically defined by an angle parameter φ and an offset parameter ρ. These parameters may be quantized and combined into a GPM partitioning index lookup table. The GPM partitioning index of the current CU may be coded into the bitstream. For example, 64 partitioning modes are supported by GPM in VVC for a CU with a size of w×h=2k×2l (in terms of luma samples) with k, l∈{3 . . . 6}. After partitioning, the two GPM sections (partitions) contain individual motion information that can be used to predict the corresponding sections in the current CU. In some embodiments, only a unidirectional motion-compensated prediction (MCP) is allowed for each section of the GPM so that the required memory bandwidth for MCP in the GPM is equal to that for the regular bidirectional MCP. To simplify the motion information coding and reduce the possible combinations for the GPM, the motion information can be coded with merge mode. The GPM merge candidate list can be derived from the conventional merge candidate list, to ensure that only unidirectional motion information is contained.

The geometric partitioning mode is one type of merge mode. Other types of merge mode include the regular merge mode, the MMVD mode, the CIIP mode and the subblock merge mode. The geometric partitioning mode is signaled using a CU-level flag as a type of merge mode. In total, 64 partitions are supported by geometric partitioning mode for each possible CU size w×h=$2^m$×$2^n$ with m, n∈{3 . . . 6} excluding 8×64 and 64×8.

As shown in the FIG. 4A, when this mode is used, a CU is split into two parts by a geometrically located straight line. Examples 400 in FIG. 4A shows different GPM splits grouped by identical angles. The location of the splitting line is mathematically derived from the angle and offset parameters of a specific partition. Each part of a geometric partition in the CU is inter-predicted using its own motion. In some embodiments, uni-prediction is allowed for each partition, such that each part has one motion vector and one reference index. The uni-prediction motion constraint ensures that, like in conventional bi-prediction, only two motion compensated prediction are needed for each CU. The uni-prediction motion for each partition is derived using the process described below.

If geometric partitioning mode is used for the current CU, a geometric partition index indicating the partition mode of the geometric partition (angle and offset), and two merge indices (one for each partition) are further signaled. The number of maximum GPM candidate size is signaled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process are then applied to the whole CU as in other prediction modes. Finally, the motion field of a CU predicted using the geometric partition modes is stored.

Uni-Prediction Candidate List Construction

The uni-prediction candidate list is derived directly from the merge candidate list constructed according to the extended merge prediction process in FIG. 4B, which shows uni-prediction MV selection for geometric partitioning mode. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in table 402 in FIG. 4B. In accordance with a determination that a corresponding LX motion vector of the n-the extended merge candidate does not exist, the L(1−X) motion vector of the same candidate is used instead as the uni-prediction motion vector for geometric partitioning mode.

Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w) \cos(\varphi_i) + (2y + 1 - h) \sin(\varphi_i) - \rho_j \quad (1)$$

$$\rho_j = \rho_{x,j} \cos(\varphi_i) + \rho_{y,j} \sin(\varphi_i) \quad (2)$$

$$\rho_{x,j} = \begin{cases} 0 & i\ \%\ 16 = 8 \text{ or } (i\ \%\ 16 \neq 0 \text{ and } h \geq w) \\ \pm(j \times w) \gg 2 & \text{otherwise} \end{cases} \quad (3)$$

$$\rho_{x,j} = \begin{cases} \pm(j \times h) \gg 2 & i\ \%\ 16 = 8 \text{ or } (i\ \%\ 16 \neq 0 \text{ and } h \geq w) \\ 0 & \text{otherwise} \end{cases} \quad (4)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = \text{part}Idx?32 + d(x, y): 32 - d(x, y) \quad (5)$$

$$w_0(x, y) = \frac{\text{Clip } 3(0, 8, (wIdxL(x, y) + 4) \gg 3)}{8} \quad (6)$$

$$w_1(x, y) = 1 - w_0(x, y) \quad (7)$$

partIdx depends on the angle index i. An example 404 for generating a blending weight $w_0$ using geometric partitioning mode is illustrated in FIG. 4C.

Motion Field Storage for Geometric Partitioning Mode

In some embodiments, Mv1 from the first part of the geometric partition, Mv2 from the second part of the geometric partition and a combined Mv of Mv1 and Mv2 are stored in the motion field of a geometric partitioning mode coded CU.

The stored motion vector type for each individual position in the motion filed are determined as:

sType=abs(motionIdx)<32?2:(motionIdx≤0?(1−
    partIdx): partIdx) (8)

where motionIdx is equal to d(4x+2,4y+2), which is recalculated from equation (1). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

If My1 and Mv2 are from different reference picture lists (one from L0 and the other from L1), then My1 and Mv2 are simply combined to form the bi-prediction motion vectors.

Otherwise, if Mv1 and Mv2 are from the same list, only uni-prediction motion Mv2 is stored.

Wedgelet Partition in AV1

Some coding approaches (e.g., AV1) apply wedgelet (or wedge) partitions for inter prediction. Wedge-based prediction is a compound prediction mode (e.g., in AV1), which is similar to GPM. The wedge-based prediction can be used for both inter-inter and inter-intra combinations. Boundaries of moving objects are often difficult approximate by on-grid block partitions. A solution is to predefine a codebook of 16 possible wedge partitions and to signal the wedge index in the bitstream when a coding unit chooses to be further partitioned in such a way. In the current wedge design in AV1 and AVM, 16 modes are supported because a maximum 16 symbols can be signaled in one syntax element with the multi-symbol adaptive context coding used in AV1 and AVM. Extending the number of modes in wedge could further increase the coding performance. The 16-ary shape codebooks containing partition orientations that are either horizontal, vertical, or oblique (e.g., with slopes ±2 or ±0.5) are designed for both square blocks 540 and rectangular blocks 542 as shown in FIG. 5D. To mitigate spurious high-frequency components, which often are produced by directly juxtaposing two predictors, soft-cliff-shaped 2-D wedge masks can be employed to smooth the edges around the intended partition (e.g., m(i, j) is close to 0.5 around the edges and gradually transforms into binary weights at either end).

In a wedge-based prediction mode, for each block size, a set of 16 predefined two-dimensional weighting arrays are hard coded. In each array, the weights are arranged in such a way as to support a predefined wedge partitioning pattern. In each wedge partition pattern, two wedge partitions are specified along a certain edge direction and position. In some embodiments, samples located in one of the two wedge partitions have weights that are set to 64, while samples located in the other Wedge partition have weights set as 0. In some embodiments, along the wedge partition boundaries, the weights are set to values between 0 and 64 according to predefined look-up tables.

In a wedge-based prediction mode, two syntax elements are defined: wedge_index, which specifies the wedge partitioning pattern index (ranging from 0 to 15, for the set of 16 predefined two-dimensional weighting arrays); and wedge_sign, which specifies which of the two partitions is to be assigned to which prediction.

Wedge-based prediction mode can also be applied to compound inter-intra prediction, namely wedge-based inter-intra prediction. In some embodiments, the prediction block is a combination of intra and inter prediction blocks, and the weights are specified using the wedge partitioning pattern specified by wedge_index (ranging from 0 to 15). The wedge-based inter-intra motion prediction mode differs from the regular wedge-based motion prediction mode described above, because the value of wedge_sign, which specifies the partition with the dominant weight, is derived as 0 instead of being signaled.

Unliked current GPM/wedgelet design, the methods and systems described herein do not limit the partitioning boundary to a limited set of pre-defined partitioning patterns that use only one straight line as the partitioning boundary. Such a single straight line partitioning boundary may not efficiently model irregular partitioning patterns.

The methods and systems described herein derive geometric/wedgelet partitions for one color component using the reconstruction samples of another color component. In some embodiments, the first color component and second color component may each be one of Y (luma), Cb (chroma) and Cr (chroma) color components. In some embodiments, the first color component and the second color components may each be one of R, G and B color components. For example, the first color component is Y (luma), and the second color component is Cb and/or Cr (chroma). The methods described herein can be applied to both geometric partitions and wedgelet partitions (e.g., the methods may be applied to geometric partitions and wedgelet partitions interchangeably, replacing geometric partitions with wedgelet partitions, or replacing wedgelet partitions with geometric partitions.)

The methods and systems described herein use reconstruction samples of a first color component to derive the geometric partition for a second color component. In some embodiments, different geometric partitions are applied for the first color component and the second color component. For example, for a current coding block that is coded using geometric partitions, given the selected/signaled geometric partition (e.g., of the first color component), the geometric partition of the second color component is adjusted using the reconstruction samples of the first color component.

In some embodiments, the second color component is adjusted using a group of pre-defined candidate geometric partitions based on the selected/signaled geometric partition (e.g., of the first color component). Each of the candidate geometric partitions is evaluated on the reconstructed block of the first color component to calculate a cost value. The candidate geometric partition which minimizes the cost values is selected as the adjusted geometric partition for the second color component.

Figure 5A:
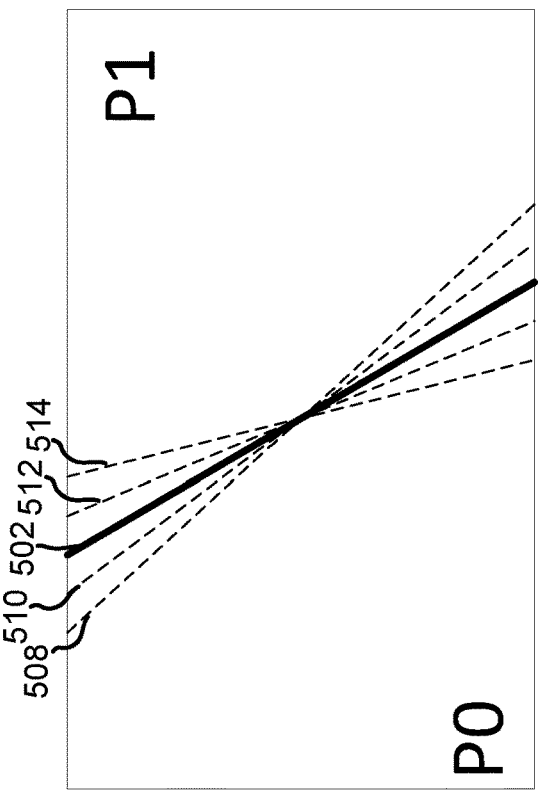
FIG. 5A shows an example of a geometric partitioning mode prediction in accordance with some embodiments.

FIG. 5A shows a rectangular block that is partitioned using geometric partition mode with a straight line, and the partition boundary is indicated by a solid straight line 502, into a first portion P1 on the right side of the solid straight line 502, and a second portion P0 on the left side of the solid straight line 502. However, an actual object boundary 503 that separates an actual first region 504 from an actual second region 506 is a curved boundary line. The rectangular block shown in FIG. 5A also depicts a reconstruction sample 501 of the first color component. In some embodiments, the reconstruction sample 501 is the result of processing the rectangular block including partitioning the rectangular block using the geometric partition mode depicted by the solid straight line 502.

Figure 5B:
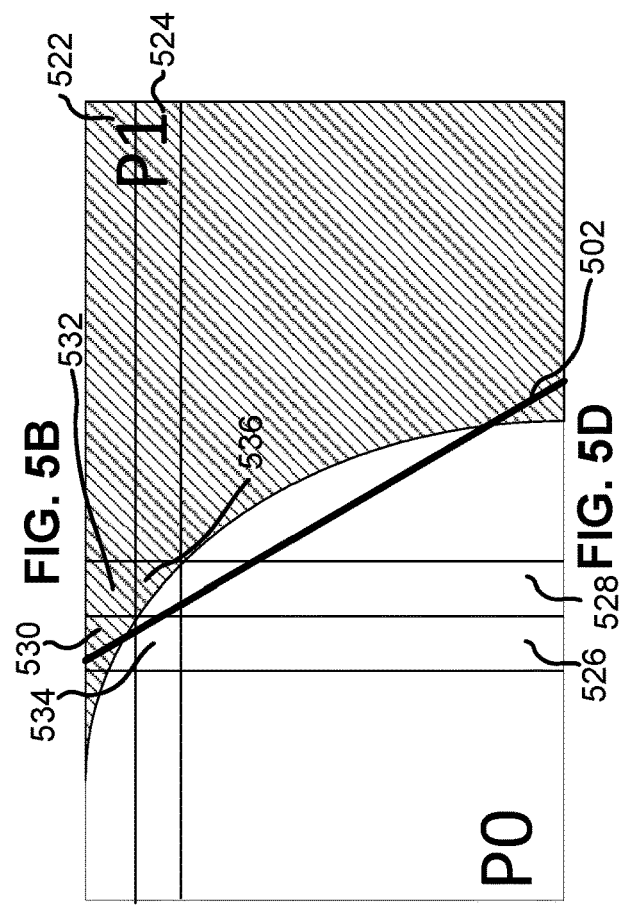
FIGS. 5B-5C show example adjusted partition pattern candidates in accordance with some embodiments.

FIG. 5B shows several adjusted partition pattern candidates 508, 510, 512 and 514 with straight partition boundary. The adjusted partition pattern candidates 508, 510, 512 and 514 all intersect with the solid straight line 502 at a same location, but are oriented at different angles with respect with one another. The adjusted partition pattern candidates 512 and 514 have a steeper gradient (e.g., larger angle with respect to a horizontal line) compared to the solid straight line 502, while the adjusted partition pattern candidates 508 and 510 have a gentler gradient (e.g., a smaller angle with respect to the horizontal line) compared to the solid straight line 502.

Figure 5C:
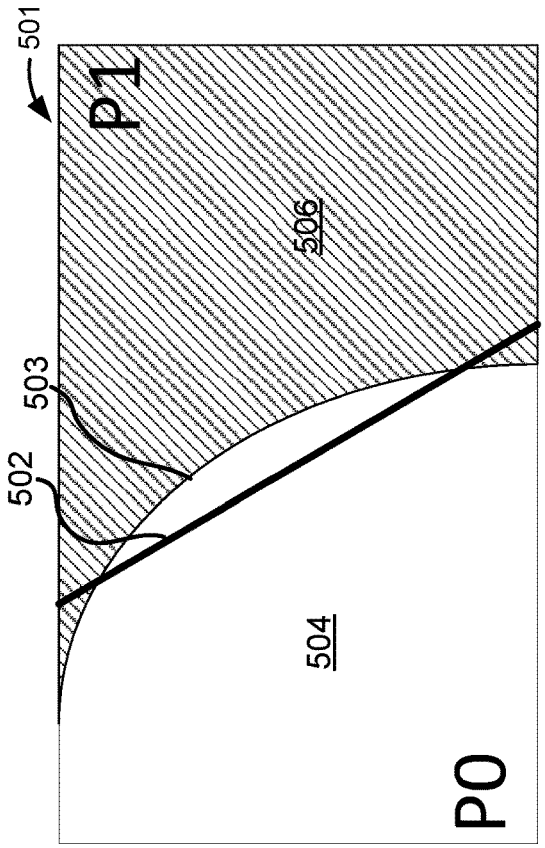
Figure 5D:
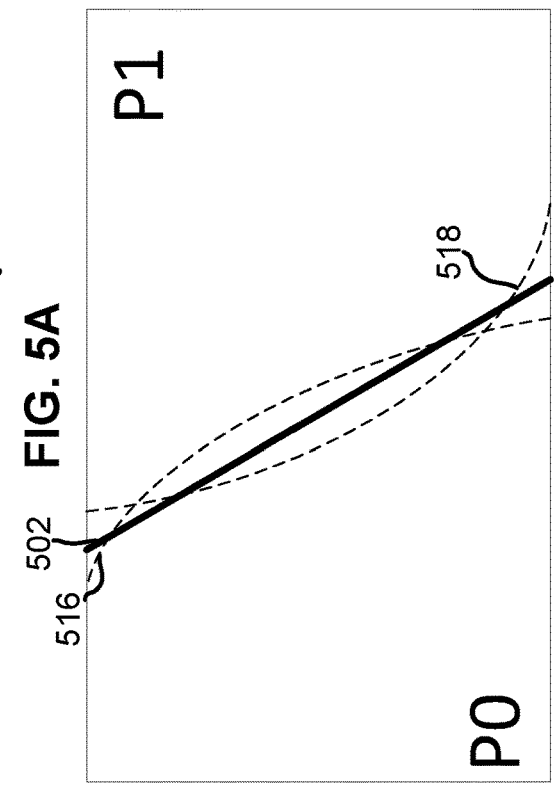
FIG. 5D shows an example of adjusting a partition boundary independently of partition pattern candidates in accordance with some embodiments.

FIG. 5C shows that the candidate geometric partitions are not limited to straight lines. Candidate geometric partition 516 is a curved line that is convex from a perspective of the second portion P0 (e.g., the geometric partition 516 is concave from a perspective of the first portion P1). In contrast, candidate geometric partition 518 is a curved line that is concave from a perspective of the second portion P0 (e.g., the geometric partition 516 is convex from a perspective of the first portion P1).

In some embodiments, each candidate geometric partition (e.g., each partition pattern candidate) is evaluated on one or more reconstruction samples of a first color component (e.g., the reconstruction sample 501) to calculate a cost value. The partition pattern candidate with the minimal cost value is then selected as the partition pattern for the second color component.

In some embodiments, the cost value is calculated as the variance value of the samples included in a particular partition of a respective partition pattern candidate. For example, the variance value is the sum, over all sample positions (or "samples"), of the difference between a value of a variable at a particular sample position and the average value of the variable, over all the sample positions, for a particular partition. Mathematically, an example cost function can be denoted using Equations (9) and (10) as:

$$\text{cost} = \sum_{i=1}^{N} \sum_{x_j \in P_i} |x_j - avg_{P_i}|^k \quad (9)$$

$$avg_{P_i} = \frac{\sum_{x_j \in P_i} x_j}{N_i} \quad (10)$$

where $avg_{P_i}$ is the average value of samples in partition $P_i$, and $N_i$ indicates the number of samples in $P_i$, and $x_j \in P_i$ means the sample in partition $P_i$, k is a predefined number, example values can be 1, 2, 1.5, N is the number of geometric partitions, example values can be 2 or 3.

For example, referring to the reconstruction sample in FIG. 5A, all samples in the first region 504 are assigned to have a value of 0 while assigning all the samples in the second region 506 to have a value of 1. In some embodiments, the reconstruction sample 501 is the reconstruction sample of a first color component (e.g., Y (luma)). If the candidate geometric partition 516 in FIG. 5C is used, the average value in the second portion P0 would be 0, and the variance for the second portion would be 0. Similarly, the average value in the first portion P1 would be 1, and the variance for the first portion would also be 0. In contrast, if the candidate geometric partition 510 in FIG. 5B is used, the average value in the second portion P0 would be greater than 1, because some portions of second region 506 (e.g., each sample location having a value of 1) would be included in the second portion P0. Similarly, the average value in the first portion P1 would be less than 1, because some portions of first region 504 (e.g., each sample location having a value of 0) would be included in the first portion P1. As a result, the variance for both the first portion P1 and the second portion P0 would no longer be 0. As a result, because the cost function associated with the candidate geometric partition 516 is lower than that of candidate geometric partition 510, the candidate geometric partition 516 would be selected as the geometric partitioning mode for the second color component. In some embodiments, the geometric partition selected for the second color component is also called the adjusted partition pattern of the second color component.

In some embodiments, instead of testing different partition pattern candidates as described above in reference to FIGS. 5B and 5C, the partition pattern is adjusted using only the reconstruction samples of the first color component to find the adjusted partition pattern for the second color component. As an illustration, in FIG. 5D, the partition pattern may be adjusted sample by sample across a respective row or a respective column. For example, FIG. 5D shows sample 530, sample 532, sample 534, and sample 536. For adjusting the partition pattern for samples across a respective row, samples of a first row 522 are processed before samples of a second row 524 are processed. In some embodiments, respective samples 530, 532, 534, and 536 are divided into smaller samples In FIG. 5D, portions of the partition boundary indicated by the solid straight line 502 are located within samples 530, 534 and 536. While processing sample 530, a location of a portion of the solid straight line 502 is shifted left or right to obtain updated cost function values, or variance values for the partitions associated with the shifted location (e.g., a first partition to a left of the shifted location of the portion of the solid straight line 502 and a second partition to a right of the shifted location of the portion of the solid straight line 502). For example, the solid straight line 502 may be shifted away from sample 530 and moved into sample 532. The average value of samples is calculated based on the updated position of straight line 502, such that samples to the left of the updated position of straight line 502 is treated as belonging to a first partition, and samples to the right of the updated position of straight line 502 is treated as belonging to a second partition. The process is then repeated for the second row 524, to obtain a placement of the straight line 502 within a respective row that minimizes the cost function (e.g., by shifting a position of the portion of the straight line 502 leftwards or rightwards within that particular row), or have the minimal variance value. In some embodiments, instead of processing every sample within a particular row, only samples adjacent to the portion of the straight line 502 are processed. The position of the portion of the straight line 502, within a particular row, that minimizes the cost function or variance value is then set as the adjusted partition pattern for that respective row. The processing continues by adjusting a position of the portion of straight line 502 in the second row 524 in a similar manner to obtain an updated position of the portion of straight line 502 that minimizes the cost function or variance value.

In contrast, for adjusting the partition pattern for samples across a respective column, samples of an $N^{th}$ column 526 are processed before samples of an $(N+1)^{th}$ column 528 are processed, or vice versa. For example, while processing sample 530 in the $N^{th}$ column 526, a location of the solid straight line 502 is shifted up or down to obtain updated cost function values or variance values for the partitions associated with the shifted location (e.g., a first partition above the shifted location of the portion of the solid straight line 502 and a second partition below the shifted location of the portion of the solid straight line 502). In one scenario, the solid straight line 502 may be shifted down from sample 530 and moved into sample 534. The average value of samples is calculated based on the updated position of straight line 502, such that samples above the updated position of straight line 502 is treated as belonging to a first partition, and samples below the updated position of straight line 502 is treated as belonging to a second partition. The process is then repeated for the $(N+1)^{th}$ column 528, to obtain a placement of the straight line 502 within a respective column that minimizes the cost function or variance value (e.g., by shifting a position of the portion of the straight line 502 upwards or downwards within that particular column). In some embodiments, instead of processing every sample within a particular column, only samples adjacent to the portion of the straight line 502 are processed. The position of the portion of the straight line 502, within a particular column, that minimizes the cost function or variance value is then set as the adjusted partition pattern for that respective column. The processing continues by adjusting a position of the portion of straight line 502 in the $(N+1)^{th}$ column 528 in a similar manner to obtain an updated position of the portion of straight line 502 that minimizes the cost function or variance value. In some embodiments, the amount of shifting (e.g., left or right shifts, and/or up and down shifts) has a fixed offset value. In some embodiments, the amount of shifting (e.g., left or right shifts, and/or up and down shifts) has a variable offset value. The offset value that provides the minimal variance value within each partition is applied as the adjusted partition boundary.

As a result, instead of selecting an adjusted partition pattern from a number of candidate partitions patterns, a particular partition pattern (e.g., straight line partition patterns, curved partition pattern, irregular partition pattern, or any other types of partition patterns) is adjusted on a row-by-row basis, and/or on a column-by-column basis.

In some embodiments, the portion of the partition boundary is adjusted by a left/right displacement and/or an up/down displacement while keeping an angle of the boundary. In some embodiments, amount of left/right displacement and/or an up/down displacement is fixed, while an angle of the partition boundary is varied. In some embodiments, the adjustment applied the portion of the partition boundary corresponds to an offset having an index in a look up table. For example, the entries of the look up table contain offset values for both angle and left/right offset and/or up/down offset of the current partition boundary.

In some embodiments, the offset value is within a predefined range, e.g., [−N, +N], example values of N include, but not limited to 1, 2, 3, 4, . . . , 16, . . . , 32. In some embodiments, a motion vector used for each partition of the first color component is reused for the adjusted partition to be applied on the second color component.

In some embodiments, a blending strength along the partition boundary of the second color component is further adjusted based on the reconstruction samples of the first color component.

In some embodiments, whether the same geometric partition or an adjusted different geometric partition is applied on the second color component is signaled for the current block. In some embodiments, whether the same geometric partition or an adjusted different geometric partition is applied on the second color component is implicitly determined using a residual (e.g., whether the residual is zero or not, whether the residual is below a threshold value, whether the residual is below a dynamically determined threshold value, or whether the residual is below a static/predetermined threshold value) of the first color component. For example, the residual may be the cost function or variance value of the first color component.

In some embodiments, the first color component and the second color component do not have the same dimension (e.g., 4:2:0 video content, or 4:2:2 video content). In such cases, a mask for geometric partitioning mode is first down-sampled to the size of the smaller dimension, before the geometric partitioning methods described herein are applied to the second color component. In some embodiments, the down-sampling is conducted using a downsampling filter. In some embodiments, the down-sampling is conducted without a downsampling filter.

The proposed methods may be used separately or combined in any order. Further, the proposed methods may be implemented by processing circuitry (e.g., one or more processors or one or more integrated circuits). In one example, the one or more processors execute a program that is stored in a non-transitory computer-readable medium.

Figure 6:
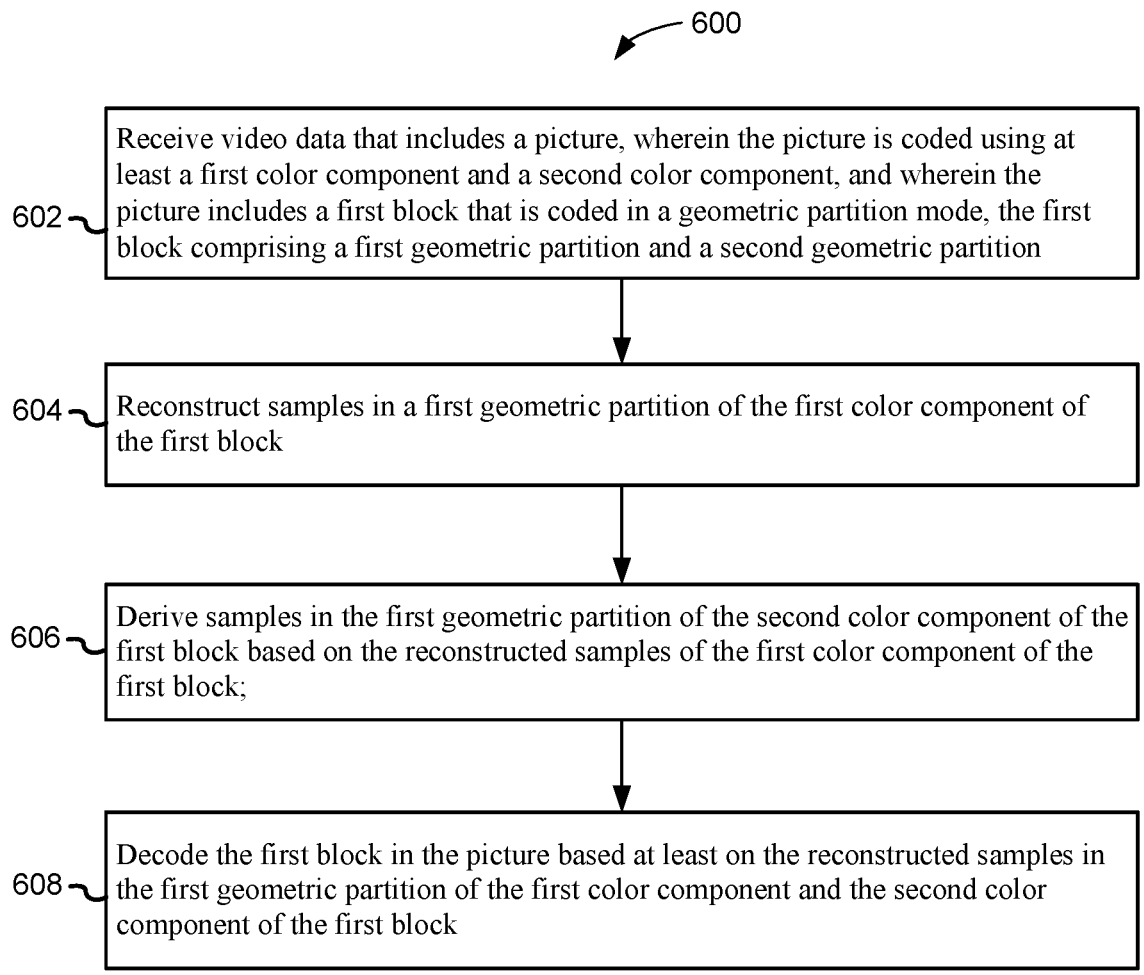
FIG. 6 is a flow diagram illustrating an example method of encoding video in accordance with some embodiments.

FIG. 6 is a flow diagram illustrating a method 600 of coding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) video data that includes a picture, wherein the picture is coded using at least a first color component and a second color component, and wherein the picture includes a first block that is coded in a geometric partition mode, the first block comprising a first geometric partition and a second geometric partition. The system reconstructs (604) samples in a first geometric partition of the first color component of the first block. The system derives (606) samples in the first geometric partition of the second color component of the first block based on the reconstructed samples of the first color component of the first block. The system decodes (608) the first block in the picture based at least on the reconstructed samples in the first geometric partition of the first color component and the second color component of the first block.

In some embodiments, the second geometric partition is distinct from the first geometric partition, and the second geometric partition is determined based on the first geometric partition.

In some embodiments, the second geometric partition is selected from a group of predefined candidate geometric partitions associated with the first geometric partition. In some embodiments, the first geometric partition is a selected/signaled geometric partition. In some embodiments, the group of predefined candidate geometric partitions include adjustments from the first geometric partition. In some embodiments, the group of predefined candidate geometric partitions includes various straight partition boundaries and/or curvy partition boundaries.

In some embodiments, the method includes evaluating a cost value for each predefined candidate geometric partition in the group of predefined candidate geometric partitions on the reconstruction data of the first color component. In some embodiments, a predefined candidate geometric partition from the group of predefined candidate geometric partitions that minimizes the cost value is selected as the second geometric partition for the second color component.

In some embodiments, evaluating the cost value includes calculating a variance value associated with each of the predefined candidate geometric partition. In some embodiments, a variance value measures a deviation of a data point (e.g., pixel) of a quantity (a luma value) from an average value of that quantity within respective partitions defined by the predefined candidate geometric partition.

In some embodiments, the second geometric partition is determined using the reconstruction data of the first color component. In some embodiments, the second geometric partition is determined without using any predefined candidate geometric partitions.

In some embodiments, a partition boundary of the second geometric partition is determined by shifting the partition boundary from a reference position to an offset position, and selecting the offset position having a minimized cost value as a location of the partition boundary. In some embodiments, the reference position is a position of the first geometric partition, and the offset position is along one of the two dimensions of the data block (e.g., row or column)).

In some embodiments, shifting the partition boundary from the reference position consists of one or more elements selected from a group consisting of: shifting the partition boundary along one or more of a horizontal dimension and a vertical dimension while fixing an angle of the partition boundary, varying an angle of the partition boundary, shifting the partition boundary by an offset that corresponds to an index of a look up table that include entries having offset values for an angle and a displacement of the partition boundary, and shifting the partition boundary by an offset value within a pre-defined range.

In some embodiments, the method includes obtaining a respective motion vector for each partition in the reconstruction data of the first color component; and applying the respective motion vector for each partition to partitions in the reconstruction data of the second color component. In some embodiments, the method includes reusing the respective motion vector, and/or the partitions in the reconstruction data of the second color component are adjusted partitions obtained using the second geometric partition.

In some embodiments, the method includes adjusting a blending strength along a partition boundary of second geometric partition in the reconstruction data of the second color component based on the reconstruction data of the first color component.

In some embodiments, the method includes providing an indication whether the second geometric partition applied to the second color component is identical to the first geometric partition, or the second geometric partition differs from the first geometric a partition. In some embodiments, the indication includes providing a signal (as metadata), to a decoder.

In some embodiments, providing the indication includes determining a residue associated with the first color component, and the method includes in accordance with a determination that the residue associated with the first color component is zero, providing an indication that the second geometric partition applied to the second color component is identical to the first geometric partition; in accordance with a determination that the residue associated with the first color component is non-zero, providing an indication that the second geometric partition applied to the second color component differs from the first geometric partition;

In some embodiments, the method includes in accordance with a determination that a dimension of the first color component in the first block of video data component differs from a dimension of the second color component in the first block of video data: prior to generating reconstruction data of a second color component of the first block of video data, downsampling a mask for a first geometric partition used to generate the reconstruction data of the first color component. In some embodiments, the video content includes 4:2:0 video content. In some embodiments, downsampling the mask for the first geometric partition is done with a downsampling filter. In some embodiments, downsampling the mask for the first geometric partition is done without a downsampling filter.

In some embodiments, the first color component is luma (Y), and the second color component is chroma (e.g., Cb and/or Cr).

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video coding. In some embodiments, the method of video coding is performed at a computing system (e.g., the server system 112) having memory and one or more processors. In some embodiments, the method is performed at a coding module (e.g., the coding module 320). The method includes receiving video data including a picture, wherein the picture is coded using at least a first color component and a second color component, and the picture includes a first block that is coded in a geometric partition mode, the first block including a first geometric partition and a second geometric partition; reconstructing samples in a first geometric partition of the first color component of the first block; deriving samples in the first geometric partition of the second color component of the first block based on the reconstructed samples of the first color component of the first block; and decoding the first block in the picture based at least on the reconstructed samples in the first geometric partition of the first color component and the second color component of the first block.

In some embodiments, the method includes obtaining reconstruction data of a first color component of a first block of video data using a first geometric partition; and generating reconstruction data of a second color component of the first block of video data based on the reconstruction data of the first color component of the first block of video data using a second geometric partition. In some embodiments, the second geometric partition is different from the first geometric partition. In some embodiments, the second geometric partition is the same as the first geometric partition. In some embodiments, the first color component is luma, and the second color component is chroma (Cb or Cr)).

(A2) In some embodiments of A1, the second geometric partition is distinct from the first geometric partition, and the second geometric partition is determined based on the first geometric partition. (A3) In some embodiments of A1 or A2, the second geometric partition is selected from a group of predefined candidate geometric partitions associated with the first geometric partition. In some embodiments, the first geometric partition is a selected/signaled geometric partition. In some embodiments, the group of predefined candidate geometric partitions include adjustments from the first geometric partition. In some embodiments, the group of predefined candidate geometric partitions includes various straight partition boundaries and/or curvy partition boundaries. (A4) In some embodiments of A3, the method includes evaluating a cost value for each predefined candidate geometric partition in the group of predefined candidate geometric partitions on reconstruction data of the first color component. In some embodiments, a predefined candidate geometric partition from the group of predefined candidate geometric partitions that minimizes the cost value is selected as the second geometric partition for the second color component.

(A5) In some embodiments of A4, evaluating the cost value includes calculating a variance value associated with each of the predefined candidate geometric partition. In some embodiments, a variance value measures a deviation of a data point (e.g., pixel) of a quantity (a luma value) from an average value of that quantity within respective partitions defined by the predefined candidate geometric partition.

(A6) In some embodiments of any of A1-A5, the second geometric partition is determined using reconstruction data of the first color component. In some embodiments, the second geometric partition is determined without using any predefined candidate geometric partitions.

(A7) In some embodiments of A6, a partition boundary of the second geometric partition is determined by shifting the partition boundary from a reference position to an offset position, and selecting the offset position having a minimized cost value as a location of the partition boundary. In some embodiments, the reference position is a position of the first geometric partition, and the offset position is along one of the two dimensions of the data block (e.g., row or column)).

(A8) In some embodiments of A7, shifting the partition boundary from the reference position consists of one or more elements selected from a group consisting of: shifting the partition boundary along one or more of a horizontal dimension and a vertical dimension while fixing an angle of the partition boundary, varying an angle of the partition boundary, shifting the partition boundary by an offset that corresponds to an index of a look up table that include entries having offset values for an angle and a displacement of the partition boundary, and shifting the partition boundary by an offset value within a pre-defined range.

(A9) In some embodiments of any of A1-A8, the method includes obtaining a respective motion vector for each partition in reconstruction data of the first color component; and applying the respective motion vector for each partition to partitions in the reconstruction data of the second color component. In some embodiments, the method includes reusing the respective motion vector, and/or the partitions in the reconstruction data of the second color component are adjusted partitions obtained using the second geometric partition.

(A10) In some embodiments of any of A1-A9, the method includes adjusting a blending strength along a partition boundary of second geometric partition in reconstruction data of the second color component based on the reconstruction data of the first color component.

(A11) In some embodiments of any of A1-A10, the method includes providing an indication whether the second geometric partition applied to the second color component is identical to the first geometric partition, or the second geometric partition differs from the first geometric a partition. In some embodiments, the indication includes providing a signal (as metadata), to a decoder.

(A12) In some embodiments of A11, providing the indication includes determining a residue associated with the first color component, and the method includes in accordance with a determination that the residue associated with the first color component is zero, providing an indication that the second geometric partition applied to the second color component is identical to the first geometric partition; in accordance with a determination that the residue associated with the first color component is non-zero, providing an indication that the second geometric partition applied to the second color component differs from the first geometric partition;

(A13) In some embodiments of any of A1-A12, the method includes in accordance with a determination that a dimension of the first color component in the first block of video data component differs from a dimension of the second color component in the first block of video data: prior to generating reconstruction data of a second color component of the first block of video data, downsampling a mask for a first geometric partition used to generate the reconstruction data of the first color component. In some embodiments, the video content includes 4:2:0 video content. In some embodiments, downsampling the mask for the first geometric partition is done with a downsampling filter. In some embodiments, downsampling the mask for the first geometric partition is done without a downsampling filter.

(A14) In some embodiments of any of A1-A13, the first color component is luma (Y), and the second color component is chroma (e.g., Cb and/or Cr).

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A14 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A14 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving video data comprising a picture, wherein the picture is coded using at least a first color component and a second color component, and wherein the picture includes a first block that is coded in a geometric partition mode, the first block comprising a first geometric partition and a second geometric partition;

reconstructing samples in a first geometric partition of the first color component of the first block using the first geometric partition;

deriving the second geometric partition for the second color component of the first block based on the reconstructed samples of the first color component of the first block;

reconstructing samples of the second color component of the first block using the second geometric partition, wherein the first geometric partition is different than the second geometric partition; and decoding the first block in the picture based at least on the reconstructed samples in the first geometric partition of the first color component and the second color component of the first block.

2. The method of claim 1, wherein the second geometric partition is determined based on the first geometric partition.

3. The method of claim 1, wherein the second geometric partition is selected from a group of predefined candidate geometric partitions associated with the first geometric partition.

4. The method of claim 3, further including: evaluating a cost value for each predefined candidate geometric partition in the group of predefined candidate geometric partitions on reconstruction data of the first color component, and wherein a predefined candidate geometric partition from the group of predefined candidate geometric partitions that minimizes the cost value is selected as the second geometric partition for the second color component.

5. The method of claim 4, wherein evaluating the cost value includes calculating a variance value associated with each of the predefined candidate geometric partition.

6. The method of claim 1, wherein a partition boundary of the second geometric partition is determined by shifting the partition boundary from a reference position to an offset position, and selecting the offset position having a minimized cost value as a location of the partition boundary.

7. The method of claim 6, wherein shifting the partition boundary from the reference position consists of one or more elements selected from a group consisting of: shifting the partition boundary along one or more of a horizontal dimension and a vertical dimension while fixing an angle of the partition boundary, varying an angle of the partition boundary, shifting the partition boundary by an offset that corresponds to an index of a look up table that include entries having offset values for an angle and a displacement of the partition boundary, and shifting the partition boundary by an offset value within a pre-defined range.

8. The method of claim 1, further comprising:

obtaining a respective motion vector for each partition in reconstruction data of the first color component; and applying the respective motion vector for each partition to partitions in reconstruction data of the second color component.

9. The method of claim 1, further comprising:

adjusting a blending strength along a partition boundary of second geometric partition in reconstruction data of the second color component based on the reconstruction data of the first color component.

10. The method of claim 1, further comprising:
providing an indication whether the second geometric partition applied to the second color component is identical to the first geometric partition, or the second geometric partition differs from the first geometric partition.

11. The method of claim 10, wherein providing the indication includes determining a residue associated with the first color component, the method further comprising:
in accordance with a determination that the residue associated with the first color component is zero, providing an indication that the second geometric partition applied to the second color component is identical to the first geometric partition;
in accordance with a determination that the residue associated with the first color component is non-zero, providing an indication that the second geometric partition applied to the second color component differs from the first geometric partition.

12. The method of claim 1, further comprising:
in accordance with a determination that a dimension of the first color component in the first block of video data component differs from a dimension of the second color component in the first block of video data:
prior to generating reconstruction data of a second color component of the first block of video data, downsampling a mask for a first geometric partition used to generate the reconstruction data of the first color component.

13. The method of claim 1, the first color component is luma (Y), and the second color component is chroma.

14. A method of video encoding performed at a computing system having memory and one or more processors, the method comprising:
receiving video data comprising a picture composed of a plurality of blocks, including a current block having a first color component and a second color component;
identifying a first geometric partition for the first color component;
identifying a second geometric partition for the second color component based on information from the first geometric partition for the first color component, wherein the first geometric partition used for the first color component is different from the second geometric partition used for the second color component; and
encoding the current block in a geometric partition mode using information from the first geometric partition and information from the second geometric partition.

15. The method of claim 14, wherein the second geometric partition is determined based on the first geometric partition.

16. The method of claim 14, wherein the second geometric partition is selected from a group of predefined candidate geometric partitions associated with the first geometric partition.

17. The method of claim 16, further including: evaluating a cost value for each predefined candidate geometric partition in the group of predefined candidate geometric partitions on reconstruction data of the first color component, and wherein a predefined candidate geometric partition from the group of predefined candidate geometric partitions that minimizes the cost value is selected as the second geometric partition for the second color component.

18. A non-transitory computer-readable storage medium storing a video bitstream that is generated by a video encoding method, the video encoding method comprising:
receiving video data comprising a picture composed of a plurality of blocks, including a current block having a first color component and a second color component;
identifying a first geometric partition for the first color component; and
identifying a second geometric partition for the second color component based on information from the first geometric partition for the first color component, wherein the first geometric partition used for the first color component is different from the second geometric partition used for the second color component; and
wherein the video bitstream comprises the current block encoded in a geometric partition mode using information from the first geometric partition and information from the second geometric partition.

19. The non-transitory computer-readable storage medium of claim 18, wherein the second geometric partition is identified using reconstruction data of the first color component.

* * * * *